NUMERICAL STORAGE PHONOGRAPH SELECTOR

Filed Jan. 22, 1968 3 Sheets-Sheet 1

Inventor
Alvan Donald Arsem
By: Olson, Trexler, Wolters, Bushnell attys.

Inventor
Alvan Donald Arsem
By: Olson, Trexler, Wolters & Bushnell Attys

Inventor
Alvan Donald Arsem
By: Olson, Trexler, Wolters & Bushnell attys

United States Patent Office 3,555,509
Patented Jan. 12, 1971

3,555,509
NUMERICAL STORAGE PHONOGRAPH SELECTOR
Alvan Donald Arsem, Clarence, N.Y., assignor to The Wurlitzer Company, Chicago, Ill., a corporation of Illinois
Filed Jan. 22, 1968, Ser. No. 699,641
Int. Cl. G11b 5/00; H04q
U.S. Cl. 340—162 12 Claims

ABSTRACT OF THE DISCLOSURE

An automatic or coin-operated phonograph wherein selections are stored in a memory device of an electrical or electromagnetic nature having a numerical but not a positional relationship to the records in the phonograph, and having memory banks of lesser number than the record selections.

The present phonograph selectors of the type used in automatic or coin-operated phonographs store selections at a physical location which is geometrically related to the physical position of the record sides to be played. In most systems the mechanism storing the selections that have been made is disposed physically adjacent to the records and respectively corresponding to the sides thereof. In one system the selections are stored in a magnetic core memory, but each selection is read out of the memory only when the sensor is positioned at the physical location of the corresponding record.

In each instance a record sensor and remover moves relative to the stored records, and this may be either with a fixed sensor and movable record magazine, or with a fixed record magazine and movable sensor. This relative motion stops with the sensor at the physical location of the record. In most instances this is effected by the selective positioning of physical stops at the respective record side positions. In the system referred to above utilizing a core memory, electrical contacts near the records and movable with the sensor are connected back into the electromagnetic matrix to effect such relative stopping. In all such existing or prior systems with which I am familiar, the only distinguishing feature for the removal of a particular record from the storage magazine is physical location.

In accordance with the present invention, a single signal or number (which can be a series of pulses) is sent to the record remover to cause it to be positioned in the desired location relative to the record magazine. In this system, the information is stored as the number or numbers of a limited number of selections. For example, for a 200 selection phonograph (A and B sides of 100 records), it can reasonably be assumed that it will not be necessary to store selections amounting to a total of more than, say, 50 at any given time. Hence, the memory device need be capable of storing information only up to a total of 50 selections. It is believed that the number of 50 presents quite a safety margin, and that in most instances a significantly smaller memory having a lesser number of selections could be used. Only the "play" positions need be indicated, with "no play" positions eliminated. In existing or prior art systems for a 200 selection phonograph, it is necessary to provide 200 position indicating and selection storage devices even on the assumption that there would never be more than 50 selections accumulated or banked at any one time.

Accordingly, it is an object of this invention to provide an automatic or coin-operated phonograph having a memory device for storing or banking selections in a group of number storage elements and not by physical location of the storage elements.

It is a further object of the present invention to provide an automatic or coin-operated phonograph having a memory device for the storing or banking of selections wherein the total number of selections that can be stored or banked at any one time is much less than the total number of record sides in the phonograph.

Yet another object of the present invention is to provide an automatic or coin-operated phonograph having a memory device in which selections are stored or banked with the information therein being read out as numbers and controlling the relative movement of a record remover and record storage magazine to positions corresponding to such numbers.

Other and further objects and advantages of the present invention will be apparent from the following description when taken in connection with the accompanying drawings wherein.

Figures 1, 2, 3:
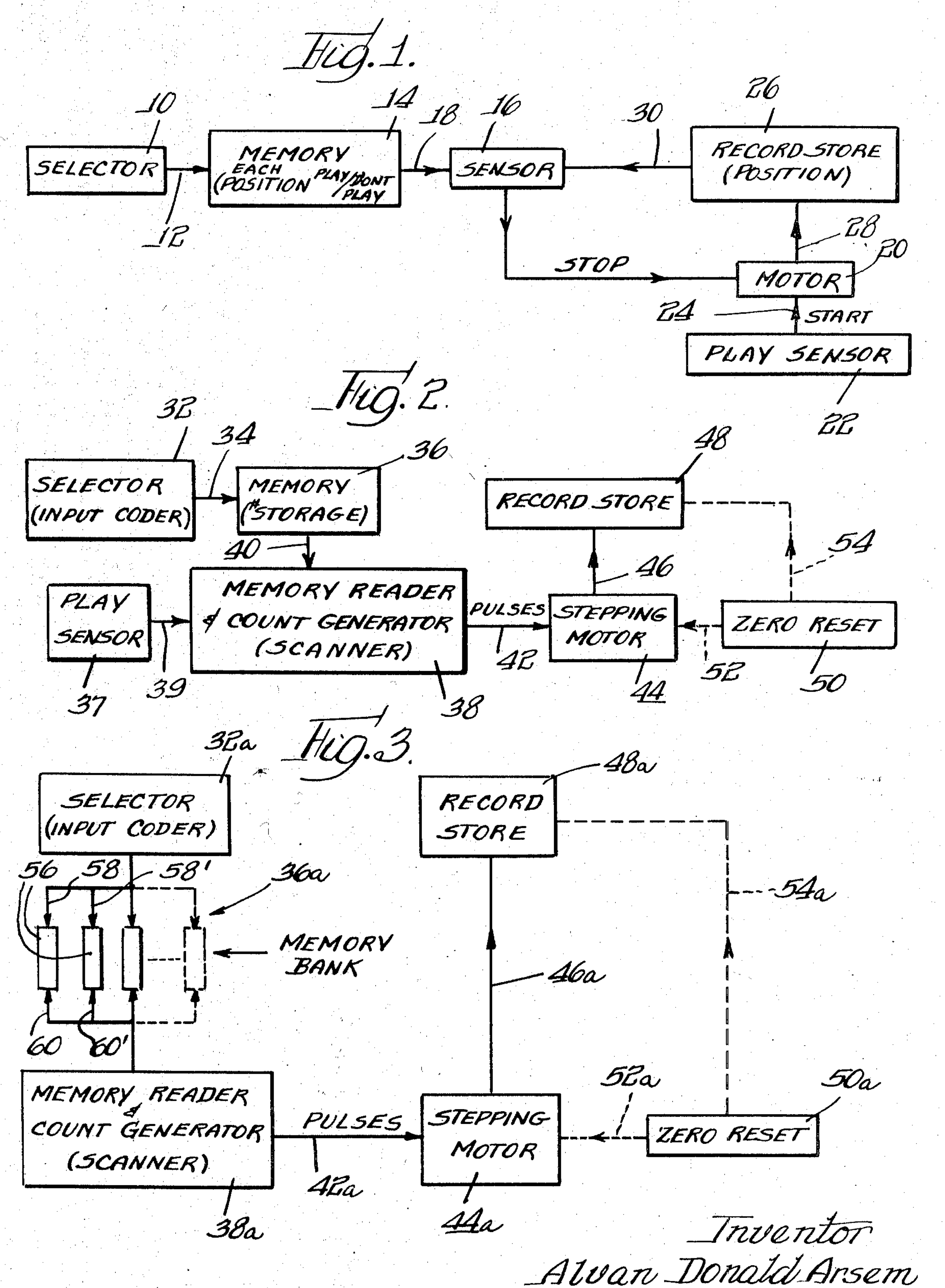
FIG. 1 is a block diagram illustrating the record selection mechanism of current commercially available coin-operated phonographs.
FIG. 2 is a block diagram of one embodiment of the present invention illustrating a digital phonograph selector mechanism.
FIG. 3 is a block diagram similar to FIG. 2 and providing a more specific block diagram representation of the memory bank and the parts cooperating therewith.

Turning now to FIG. 1, there is shown first a block 10 representing a selector, connected as at 12 to a memory device 14. The selector device is of the type used in any currently available commercial phonograph, comprising a coin credit device, and a series of push buttons. Such push buttons are usually arranged in letter and number groups; for example, ten letter groups each of twenty numbers, giving a possible 200 selections. Two hundred selections is a rather common number in currently available phonographs, comprising both A and B sides of 100 records.

The memory 14 provides a plurality of stops which are physically related to the position of the stored records. In one preferred type of record storage device, the records are stored in a carrousel or toroidal arrangement (see, for example, Osborne et al. 3,165,321, and commerical phonograph sold by The Wurlitzer Company at the present time and for the past several years). A circular array of stop pins is provided which afford "play" or "no play" informaton. Thus, when a pin is in raised position, it indicates "Yes" that the record corresponding thereto is to be played. When the pin is down, it indicates "No" that the record is not to be played. For 200 record sides, 200 pins are required.

It will be understood that there are other types of commercially available machines at the present time that operate with the records in a straight line array, and such machines comes equally well under the block diagram of FIG. 1, even though the memory unit may use electrical play/don't play storage for each record storage position.

The positional memory 14 is related to a sensor 16, as indicated at 18. Specifically, this comprises a device which physically senses the position of the pins referred to in the memory 14. The device may actually physically stop the motion of associated parts, or may provide an electrical signal to stop the motion.

A motor is indicated at 20, and this is generally of the continuously operable type, and may also include a gear reducing mechanism. A play sensor 22 provides a start signal as indicated at 24 at an appropriate time. The play sensor is related to the record playing mechanism so that when one record finishes playing, the start signal at 24 will be applied to the motor 20 to start the motor. The motor is held in operation by a "full cycle relay" until a complete cycle of operation has been gone though for the sensor to determine whether any additional selections remain in the memory device.

When the motor runs, it turns the record store 26 as indicated at 28, and the record store turns the sensor with it as indicated at 30. In referring to the parts as turning, I have reference to a carrousel or the like type of record storage and changer as noted heretofore, and the movement is relative to record transferring and playing mecahnism. In some commercially available phonographs, the movement is linear rather than turning, and in some instances it is the record transferring and playing mechanism that moves relative to the store, but the principles are identical. There is a relative movement of the record store and record shifting and playing mechanism which is accompanied by movement of the sensor relative to the memory, with movement being stopped when the sensor reaches a physical position that corresponds to a selection in the memory. In the one instance mentioned previously with a magnetic matrix memory circuit for storage, the sensor engages electric contacts corresponding to physical positions in the memory, and these correspond to physical positions of the record store.

Turning now to FIG. 2 wherein one embodiment of my present invention is disclosed, there will be seen a selector or input coder 32 connected at 34 to a memory 36 of the number storage type. The memory preferably is of a known type using a complex of flip-flops. The selector on the face of it to the user could appear very similar to a present selector, having push buttons or other switches arranged in number and letter groups or directly in a matrix, and producing either directly or indirectly a binary, trinary, or other code for storing number information in the memory 36.

A memory reader 38 coacts at 40 with the memory 36, and counts from zero up to a number found in the memory, correspondingly sending out pulses as indicated at 42 to run a stepping motor 44 connected at 46 to turn or otherwise move the record store 48 relative to the record transferring and playing mechanism. A play sensor 37 is connected at 39 to the memory reader and count generator 38 to start operation. The stepping motor is a high torque motor commercially available, and which steps 3.6 degrees for each pulse, thus taking 100 steps to turn a complete 360 degrees. In the toroidal or carrousel type of record storage and changer, as noted heretofore, there are 100 records, each with A side and a B side, and it therefore takes 100 steps for a complete 360°.

The stepping motor is connected at 46 to the record store 48. Since a stepping motor is used, and the scanner comprising the memory reader and count generator start from zero, it is necessary to start the stepping motor from zero after each selection. Hence, there is shown a zero reset 50 which is connected to the stepping motor at 52, or to the record store at 54. One simple method of zero reset is simply to run the motor from wherever it has stopped to the zero position, and this would be effected through the connection noted at 52. Alternatively, and perhaps somewhat more complicated, connection could be made from the zero reset at 54 to the record store, and it is suggested that a spring winding up with the record store could be used for returning to zero.

Turning to FIG. 3, most of what is shown is substantially identical with that in FIG. 2, and similar numerals are used with the addition of the suffix *a*. The principal purpose of FIG. 3 is to expand somewhat on the memory **36*a*; specifically, a memory bank having a plurality of registers 56. For a 200 selection phonograph, and assuming that there would never be more than 50 selections banked at one time, there are 50 registers 56. Each of these is an eight bit register, recognizing that $2^8$ is 256, the next largest number over 200 reached in powers of two. The solid line arrow 58 from the selector or input coder to the first register indicates an input to the first register. After an input has been made therein, there is a shift at 58' to provide an input to the second register, etc. The readout sequence is similar, the solid line arrow at 60 indicating reading out of the first register. Subsequently, there is a shift as indicated by the dashed arrow 60'** to the second register, etc., through the entire register.

Figures 4, 5, 6:
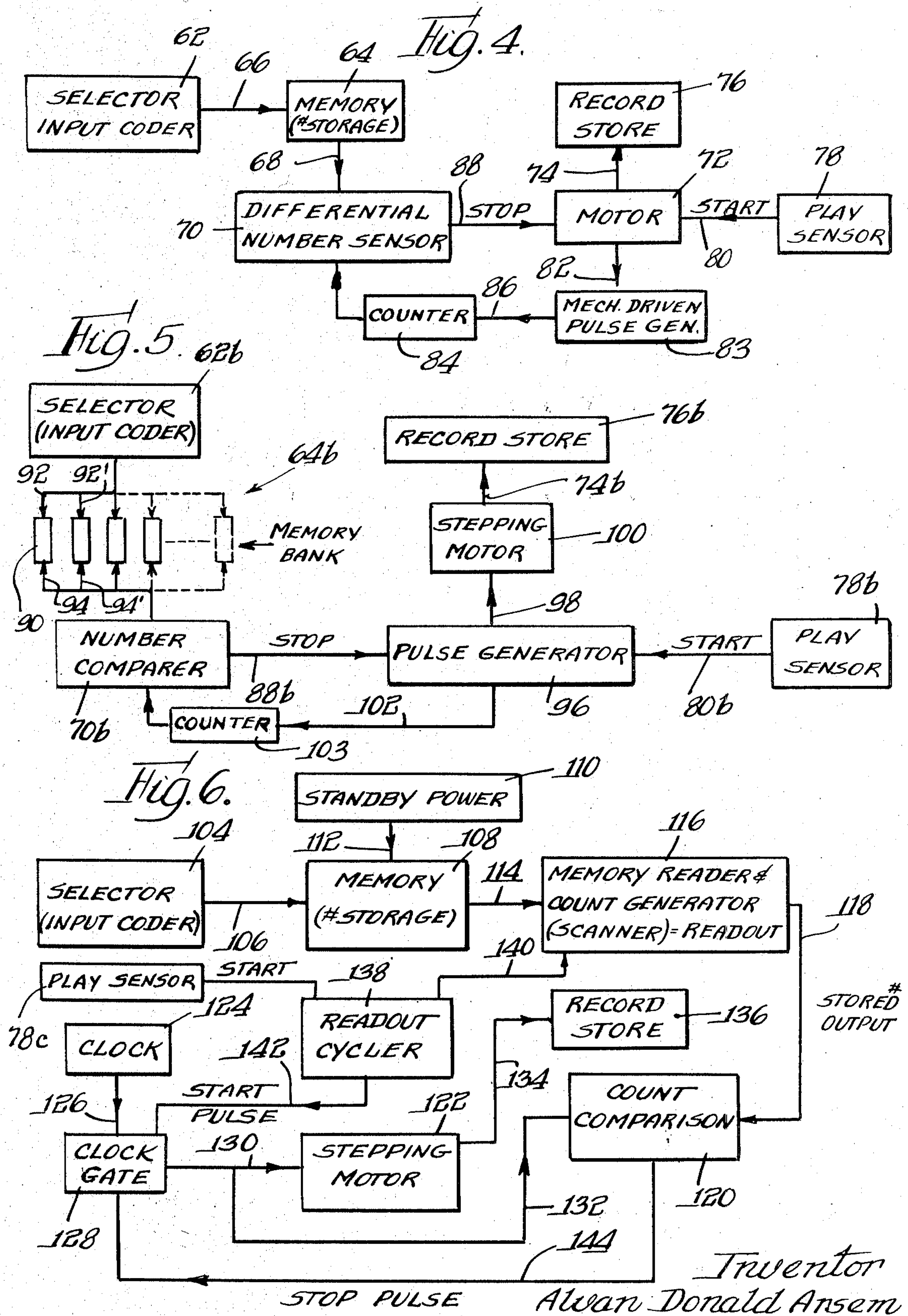
FIG. 4 is a block diagram illustrating a further embodiment of the present invention using an external feedback loop.
FIG. 5 is a block diagram generally similar to FIG. 4 with a more detailed block showing of the memory bank and with a different type of motor.
FIG. 6 is a block diagram similar to preceding figures and with further details.

The system of FIGS. 2 and 3 might be considered a "return-to-zero" system. In each instance the pulse train is equal to the number in the register. In FIG. 4 a continuous system is illustrated, and includes a selector or input coder 62 similar to that in FIGS. 2 and 3, and feeding a memory 64 of the number storage type as indicated at 66, generally similar to FIG. 2. The connection from the memory, through number reading means as indicated at 68, is to a differential number sensor 70.

The motor 72 is connected at 74 to turn or otherwise move the record store 76 relative to the playing mechanism, and it will be understood that the playing mechanism could be moved equally as well as the record store. A play sensor is provided at 78 and operatively connected to the motor 80 to start the motor. The motor is connected at 82 to a mechanically driven pulse generator 83 which in turn is connected to a counter 84. The motor is of the continuous run type, and the drive at 82 may include the output from a gear reducer, the counter being driven thereby and comprising, as a simple example, a commutator connected to a converter from pulses to binary. The counter 84 in turn is connected back at 86 to the differential number sensor, and it will be understood that the single line 86 may comprise a plurality of wires (eight for the eight bit register contemplated), as does the single line from the number reading means at 68. The differential sensor 70 senses an equal setting of a group of flip-flops in the memory 64 and in the counter 84 to provide an output stop signal at 88 from the differential number sensor to the motor 72 whereby to stop the motor 72.

FIG. 5 is generally similar to FIG. 4 and adds some additional details on the memory device, and also shows operation with a stepping motor, rather than a continuous run motor. To a certain extent the parts of FIG. 5 are identical with those of FIG. 4, and hence similar numerals are used with the addition of the suffix *b*. The memory **64*b* is indicated as a memory bank comprising a plurality of registers 90. Storage of numbers in the successive banks is accomplished as indicated at 92, 92', etc. throughout the registers of the bank, while scanning or reading out thereof is effected in sequence at 94, 94'**, etc.

One difference in FIG. 5 from FIG. 4 is that a pulse generator 96 is used connected at 98 to a stepping motor 100, this stepping motor acting at **74*b* to drive the record store 76*b*. The start signal at 80*b* from the play sensor 78*b* is connected to the pulse generator, and besides operating the stepping motor 100, the pulse generator sends pulses at 102 to a counter 103 and then to a number comparer 70*b*, which perhaps it should be noted is the same as the differential number sensor. When the number from the pulse generator equals the number in a particular register being checked, then the number comparer sends out a stop signal at 88*b* to the pulse generator 96** to stop the pulse generator, and hence to stop the stepping motor and record store for the playing of the selected record.

The system of FIG. 6 is similar to the previously described systems, and includes an external feedback loop. This system includes an input coder or selector 104 connected at 106 to a number storage memory 108 as previously indicated. It must be borne in mind that a coin-operated phonograph is subject to inadvertent disconnection of the electric power, such as by someone's accidentally kicking the power cord out of the outlet. In the preferred case where flip-flops are used in the memory, this can result in a loss of the numbers stored. Accordingly, a preferred adjunct to the invention includes a standby power source 110 connected to the memory at 112. The standby power source can be a battery, a storage capacitor, etc. The number storage is connected at 114 to a readout device 116, which is, in effect, a memory reader and a counter generator having an output at 118 connected to a count comparison device or comparer 120.

The present system incorporates a stepping motor 122. Motive power for the stepping motor is provided by a clock 124 having an output at 126 to a clock gate 128. When the gate is open, the output therefrom is connected at 130 to the stepping motor to run the stepping motor, and also is connected at 132 to the count comparison device 120. The stepping motor is connected at 134 to run the record store 136 relative to the record playing mechanism, and it will be understood, again, that the playing mechanism could be moved relative to the record store. In a broad sense, the "record store" could be considered to include bothe the magazine and the record shifting and playing mechanism with either the magazine moving relative to the shifting and playing mechanism, or vice versa.

A readout cycler 138 is provided, which is initiated by a play sensor as mentioned previously. The readout cycler is connected at 140 to the readout device 116 to start it in operation, and is also connected at 142 to the clock gate for opening of the gate by a start pulse from the readout cycler. A connection also is made to the clock gate at 144 from the count comparison device 120 to provide a stop pulse when the gate again is to close.

Operation of this system will be apparent from what has gone before. The selector or input coder stores a number corresponding to a particular record in the memory 108.When the readout cycler is operated, as by the completion of the playing of one record, the readout device 116 is started in operation, and sends pulses corresponding to the stored number to the count comparison device 120. At the same time as the readout cycler starts the readout device in operation, it opens the clock gate, whereby the clock sends pulses to the stepping motor 122 to move the record store 136, and also sends pulses to the count comparison device 120. When the clock has supplied the number of pulses to the stepping motor to bring the count comparison up to that of the stored number output, then a stop pulse is provided at 144 to close the clock gate, whereby to stop the stepping motor and the record store.

Figure 7:
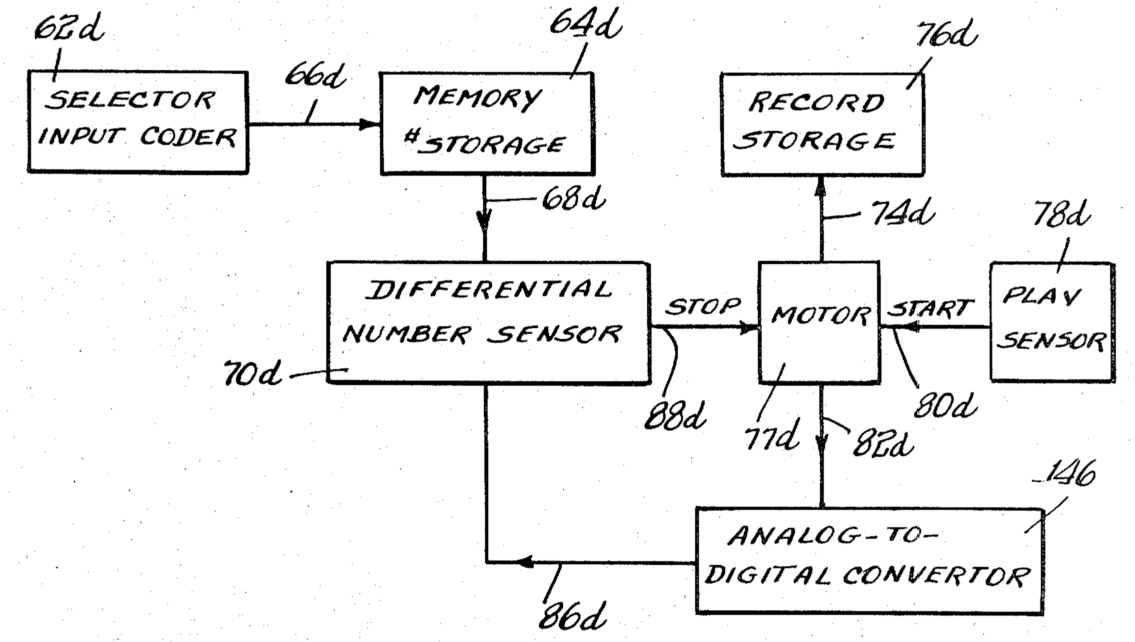
FIG. 7 is a block diagram similar to FIG. 4, but utilizing an analog-to-digital converter in place of the pulse generator and counter.

The selector mechanism of FIG. 7 is generally similar to that of FIG. 4. Like numbers with the addition of the suffix *d* are used to identify similar parts, and thereby to obviate repetitious description. The essential difference is that an analog-to-digital converter 146 is driven (or controlled) at **82*d* by the motor 72*d* to supply directly usable digital information at 86*d* to the differential number sensor 70*d***.

From the foregoing, it will be apparent that I have provided a digital phonograph selector mechanism wherein information as to records to be played is stored by number in arbitrary memory positions rather than by record position. In other words, what I have herein disclosed is a digital selector, as distinguished from the present analog selectors. The system may operate with a stepping motor, or with a continuous run motor, and the system may start from zero, or may restart from wherever it last stopped.

The word "motor" is used in the claims in a broad sense as any device for moving, and could be a linear actuator, a solenoid and pawl and ratchet mechanism, etc., as well as a more conventionally regarded rotor-and-stator rotary motor.

The specific examples of the invention as herein shown and described are for illustrative purposes only. Various changes will no doubt occur to those skilled in the art, and will be understood as forming a part of the present invention insofar as they fall within the spirit and scope of the appended claims.

The invention is claimed as follows:

1. A record retrieval system comprising a group of selection number memory elements substantially less than the number of record selections in said system each of which can represent a selection location in the record storage means upon demand, each memory element being available to be used to store the number identification of any record in said system, an input selector coder for inserting encoded number information in one or more as required of said group of said memory elements, search and readout means connected to said group of memory elements, record storage means in which records are stored, means for effecting relative movement of said record storage means and record playing mechanism and including a motor drive, means for controlling the operation of said motor drive, and circuit means connecting to said motor drive and to said search and readout means for controlling the operation of said motor drive to effect relative movement of said record storage means and record transcribing mechanism to reach a record corresponding to a number read out by said search and readout means.

2. A system as set forth in claim 1 wherein the motor drive comprises a stepping motor, and wherein said circuit means comprises a pulse generator connected to said stepping motor and to said search and readout means to step the motor a number of steps corresponding to the number readout from the memory by said search and readout means.

3. A system as set forth in claim 2 wherein said circuit means further includes a number comparer connected to said search and readout means, said pulse generator being connected back to said number comparer as well as to said motor, and means connecting said number comparer to said pulse generator to stop said pulse generator when the number of pulses generated corresponds to the number readout of said memory by said search and readout means.

4. A system as set forth in claim 2 and further including zero reset means for returning said stepping motor and said record storage and playing means to zero position following a record playing operation.

5. A system as set forth in claim 3 wherein said pulse generator includes a clock and a clock gate, means for opening said gate, and feedback means included in said circuit means connecting said number comparer and said clock gate to close said gate.

6. A system as set forth in claim 1 wherein said circuit means comprises a pulse generator run by said motor drive, a counter connected to said pulse generator, and a differential number sensor connected to said counter, to said search and readout means, and to said motor drive to stop operation of said motor drive when said counter corresponds to the number readout by said search and readout means.

7. A system as set forth in claim 6 wherein the motor drive includes a motor of the continuous run type, and the motor drive is rendered inoperative with the record storage means and the record transcribing means in relative position to transcribe a record corresponding to the number readout.

8. A system as set forth in claim 1 wherein said circuit means comprises an analog-to-digial converter controlled by said motor, and a differential number sensor connected to said converter, to said search and readout means, and to said motor to stop said motor when said converter corresponds to the number readout by said search and readout means.

9. A system as set forth in claim 8 wherein the motor is of the continuous run type, and the motor drive is rendered inoperative with the record storage means and the record transcribing means in relative position to transcribe a record corresponding to the number readout.

10. A record retrieval system comprising a group of selection number memory elements substantially less than the number of record selections in said system each of which can represent a selection location in the record storage means upon demand, each memory element being available to be used to store the number identification of any record in said system, an input selector coder for inserting encoded number information in one or more as required of said group of memory elements, search and readout means connected to said group of memory elements, record storage means in which said records are stored, means for effecting relative movement of said record storage means and record playing mechanism and including a stepping motor, a pulse generator connected to said stepping motor and to said reading means and effective to step said motor a requisite number of steps to effect relative movement of said record storage means and record playing mechanism to reach a record corresponding to a number read out by said search and readout means.

11. A numerical storage phonograph system comprising a number storage memory, an input selector coder for storing number information in said memory as to records selected, number reading means connected to said memory means, record storage means, means for effecting relative movement of said record storage means and record playing mechanism and including a motor, means for running said motor, and circuit means connected to said motor and to said number reading means for controlling the running of said motor to effect relative movement of said record storage means and record playing mechanism to reach a record corresponding to a number read out by said number reading means, said circuit means comprising a pulse generator run by said motor means, a counter connected to said pulse generator, and a differential number sensor connected to said counter to said number reading means and to said motor to stop said motor when said counter corresponds to the number readout by said reading means.

12. A numerical storage phonograph system comprising a number storage memory, an input selector coder for storing number information in said memory as to records selected, number reading means connected to said memory means, record storage means, means for effecting relative movement of said record storage means and record playing mechanism and including a motor, means for running said motor, and circuit means connected to said motor and to said number reading means for controlling the running of said motor to effect relative movement of said record storage means and record playing mechanism to reach a record corresponding to a number read out by said number reading means, said circuit means comprising an analog-to-digital converter controlled by said motor means, and a differential number sensor connected to said converter, to said number reading means, and to said motor to stop said motor when said converter corresponds to the number read out by said reading means.

References Cited

UNITED STATES PATENTS

| | | | |
|---|---|---|---|
| 3,028,580 | 4/1962 | Durant | 340—162 |
| 3,158,844 | 11/1964 | Bowdle | 340—174.1 |
| 3,449,735 | 6/1969 | Cogar | 340—174.1 |

DONALD J. YUSKO, Primary Examiner